United States Patent
Young

[15] 3,687,982
[45] Aug. 29, 1972

[54] SEPARATION OF MIXED DIASTEREOISOMERS OF ZEARALANOL

[72] Inventor: Vernon V. Young, Terre Haute, Ind.

[73] Assignee: Commercial Solvents Corporation, Terre Haute, Ind.

[22] Filed: March 9, 1971

[21] Appl. No.: 122,539

[52] U.S. Cl. ............................................260/343.2 F
[51] Int. Cl. .................................................C07d 9/00
[58] Field of Search ................................260/343.2 F

[56] References Cited

UNITED STATES PATENTS 3,239,345  3/1966  Hodge et al.........260/343.2 X

*Primary Examiner*—John M. Ford
*Attorney*—Morton, Bernard, Brown, Roberts & Sutherland

[57] ABSTRACT

A mixture of the diastereoisomers of zearalanol is formed when zearalenone is catalytically reduced in the presence of hydrogen. Separation of the diastereoisomers can be effected by converting them to a mixture of their 6'-acetate esters, separating the 6'-acetate esters by fractional crystallization from a monohydric alkanol of one to five carbon atoms, e.g., from methanol, and de-esterifying the separated esters to yield separated zearalanol diastereoisomers.

17 Claims, No Drawings

SEPARATION OF MIXED DIASTEREOISOMERS OF ZEARALANOL

This invention relates to a process for resolving a mixture of zearalanol into its components. The term zearalanol conforms with the nomenclature in an article by Johnston et al., "Synthesis of Dideoxyzearalanone and Hydroxyl Derivatives," Journal of Medicinal Chemistry, Volume 13, No. 5 (1970), page 941.

Compounds whose molecules contain the same number and kind of atoms arranged in the molecule in an identical manner except for their relative positions are termed stereoisomers. Two stereoisomers are called enantiomorphs or enantiomers when they are mirror images, have no plane of symmetry, and essentially differ only with respect to the direction in which they rotate the plane of polarized light, the angle of the crystal faces, and some related properties. Enantiomorphs have identical physical properties and nearly all of the chemical properties are also identical (the principal exception being reactions in biological systems catalyzed by enzymes). Enantiomorphs are also called optical isomers. Separation of enantiomorphs is generally referred to as resolution and can sometimes be accomplished biochemically or by manual sorting of crystals.

Stereoisomers which are not enantiomorphs (i.e., not mirror images) are called diastereoisomers, which is often shortened to diamers. Diastereoisomers usually differ in optical rotation and in chemical and physical properties. A mixture of two diastereoisomers will have a melting point that differs from that of each of the diamers. Mixtures of diastereoisomers have, on occasion, been separated by fractional crystallization or fractional distillation.

When zearalenone, having the formula,

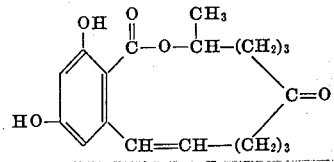

is converted to zearalanol, having the formula,

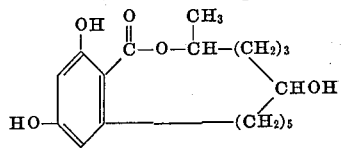

by the catalytic reduction of the olefinic bond and the ketone group in the presence of hydrogen, a mixture of diastereoisomers of zearalanol is formed, one of which has a higher melting point than the other. This reduction is disclosed in U.S. Pat. No. 3,239,345, issued on Mar. 8, 1966.

Both diamers of zearalanol are useful as anabolic and estrogenic substances for oral and parenteral administration to animals in the manner disclosed in U.S. Pat. No. 3,239,345. Depending on the intended use for the compound, however, it may be preferred to employ one or the other diamer in a major amount, or even exclusively. Although a portion of the higher melting diastereoisomer can be separated out of the mixture by the procedure disclosed in Example VI of U.S. Pat. No. 3,239,345, separation by this procedure is not nearly complete, however, and the remaining zearalanol still contains a substantial amount of each diastereoisomer.

This invention is directed to a process of separating mixed diastereoisomers of zearalanol, which process comprises i. dissolving the mixed diastereoisomers in acetic acid, ii. maintaining the resultant solution at a temperature sufficient to effect esterification of the aliphatic hydroxyl group of the zearalanol, thus yielding mixed 6'-acetate esters of the diastereoisomers of zearalanol.

iii. separating the 6'-acetate esters of the zearalanol diamers by fractional crystallization and iv. de-esterifying the acetate groups of the separated esters, thus yielding separated diastereoisomers of zearalanol.

A mixture of zearalanol diastereoisomers can be prepared by first preparing and purifying zearalenone as described in Examples II and III of U.S. Pat. No. 3,239,345, issued Mar. 8, 1966, and then reducing the zearalenone to zearalanol as follows:

One gram of zearalenone was reduced in 150 cc. of ethanol at room temperature and 50 p.s.i. of hydrogen for 4 hours in the presence of a small amount of Raney nickel (about 1 cc. of a thick suspension in water). The product was concentrated, treated with 5 milliliters of isopropyl alcohol, cooled and filtered. The filtrate was mixed with 5 milliliters of water, left standing overnight, cooled and filtered to provide 0.65 gram of product (1) having a melting point of 147°–157° C. This product was recrystallized from isopropyl alcohol-water mixtures two times to provide 0.18 gram of a product (2) having a melting point of 178°–180° C. A product (3), having a melting point of 146°–148° C. and weighing 0.22 gram, was also recovered from the filtrate after the first recrystallization of the product weighing 0.65 gram. The reduction of the ketone group introduces an asymmetric carbon atom and makes diastereoisomers possible. The optical activities of the two products were, for the product (2) with a melting point of 178°–180° C., $[\alpha]_D^{25}$= about + 46° eq., and for the product (3) with a melting point of 146°–148° C., $[\alpha]_D^{25}$= about + 39° eq., where $[\alpha]$ = (0.100/c·) c=1 percent in methanol and l=2 dcm.

Product (2) is the pure, high-melting diastereoisomer of zearlanol. Product (3), which has a melting point of 146°–148° C., is a mixture of the two diastereoisomers of zearalanol wherein the diastereoisomers are not present in equimolar amounts. Products (1) and (3) are suitable for treatment according to the process of the present invention. The diamer mixture subjected to the present process preferably contains at least about 10 weight percent, e.g., about 40 to 60 weight percent, of each diamer.

The acetic acid in which the diamer mixture is dissolved in the process of the present invention has a $CH_3COOH$ concentration, based on the weight of the acid, of at least about 90 percent, preferably at least about 95 percent. Most preferably, the acid is glacial acetic acid. The amount of acetic acid employed is preferably sufficient to dissolve substantially all of the zearalanol, and most preferably the ratio of acetic acid to zearalanol in the solution is at least about 2 milliliters per gram, e.g., about 2 to 10, most advantageously about 3 to 7, milliliters of acid per gram of zearalanol.

Concentrated sulfuric acid can be used to catalyze the esterification reaction if desired. Suitable amounts thereof will usually be about 0.1 to 5 parts by weight of concentrated sulfuric acid per each 100 parts by weight of $CH_3COOH$. The most preferred temperature for the uncatalyzed esterification reaction is about 75° to 120° C. The use of catalytic amounts of concentrated sulfuric acid permits the use of generally lower reaction temperatures, down to, say, about 15° C., e.g., about 15° to 40° C., preferably about 25° to 30° C. The esterification is generally continued for at least about 18 hours, e.g., for about 18 to 36 hours, preferably for about 18 to 24 hours.

Recovery of the zearalanol, 6'-acetate can be effected by any suitable means, for example by cooling the reaction solution to about 25° to 30° C., and holding it there with agitation so as to effect precipitation of the acetate. The acetate can be separated by filtration, washed with water or acetic acid, and then dried, preferably at a maximum temperature of about 80° C. The filtrate can be reused, if desired, to produce more of the acetate.

Separation of the resultant 6'-acetates of the diamers of zearalanol is effected by fractional crystallization from a solution of the mixed esters in a monohydric alkanol of one to five carbon atoms. The preferred solvent is methanol, from which the 6'-acetate of the high melting diamer can be selectively crystallized by cooling the solution down to a temperature of about 30° C. or less, e.g., about 0° to 25° C., most preferably about 5° to 20° C. Where methanol is used as the crystallization solvent, the solution preferably contains about 10 to 20, e.g., about 12 to 15, milliliters of methanol per gram of zearalanol, 6'-acetate prior to the crystallization of the 6'-acetate of the high melting zearalanol diamer therefrom. If ethanol is employed as the crystallization solvent, about one-third less of it will be required than when using methanol.

Dissolution of the 6'-acetates in the crystallization solvent is best effected by heating the solvent to boiling under atmospheric pressure. The cooling and crystallization are advantageously accompanied with substantially continuous agitation of the solution. Recovery of the crystallized ester of the high melting diamer can then be effected by filtration, decantation, or centrifugation.

Recovery of the 6'-acetate of the low melting diamer of zearalanol can be effected by any suitable method. Where, for example, separation of the esters is by fractional crystallization and filtration of the ester of the high melting diamer from methanol, then the methanolic filtrate can be concentrated to crystallize out the ester of the low melting diamer.

Purification of the esters of the two diamers of zearalanol can be accomplished by recrystallization from a suitable solvent such as methanol, ethanol or ethyl acetate.

The 6' of the high melting diamer of zearalanol is a normally solid material having a melting point (after pre-melting and re-solidifying) of about 133°–134° C. The 6'-acetate of the low melting diamer is also a solid, but has, paradoxically, a higher melting point (about 163°–164° C.) than the corresponding ester of the high melting diamer.

De-esterification of the acetate groups of the separated 6'-acetate esters of the diamers of zearalanol can be effected by any suitable means, for example by transesterification, or by acid hydrolysis, or by saponification with a base. Most preferably, though, it is accomplished through transesterification with a displacing alcohol which, like the crystallization solvent, is a monohydric alkanol of one to five carbon atoms.

Acid catalyzed transesterification, e.g., using hydrochloric acid or sulfuric acid as the catalyst, is most preferred. Suitable temperatures for this reaction range generally from about 50° C. up to the atmospheric pressure boiling point of the displacing alcohol, e.g., about 65° C. in the case of methanol. The amount of displacing alcohol employed is preferably sufficient to dissolve substantially all of the 6'-acetate ester. When using methanol, for instance, it is preferred to use about 2-½ to 10 milliliters of the alcohol per gram of the ester. The molar ratio of acid catalyst to the zearalanol, 6'-acetate used is preferably about 0.01 to 0.1. The more catalyst that is used, the shorter will be the reaction time, and the latter will usually range from about 2 to about 6 hours.

Recovery of the zearalanol diamers can be effected by any suitable manner. If, for example, the zearalanol is produced by transesterification in methanolic solution, the solution can first be treated with charcoal and filtered, cooled to about 55°–60° C., diluted with water, and then slowly cooled further, say to about 20° C., so as to crystallize the zearalanol out of solution. The crystallized zearalanol can then be separated from its mother liquor, washed with a suitable solvent (e.g., water for the low melting diamer and a 50/50 (by weight) mixture of methanol and water for the high melting diamer), and then dried.

The process of this invention is exemplified in the following example, which is for illustrative purposes only and is not to be considered limiting.

EXAMPLE

Preparation of Zearalanol, 6'-Acetate

A solution of 100g. of mixed diamers of zearalanol (55 percent high melting and 45 percent low melting) in 500 ml. of glacial acetic acid was heated at reflux for 24 hours. The resultant mixture was then transferred to another vessel and stirred and aged therein at 25° to 30° C. until precipitation was complete (18 to 24 hours). The precipitated mixture of the 6'-acetate esters of the diamers of zearalanol was isolated, rinsed with 50 ml. of chilled glacial acetic acid, and dried. Yield was 81 to 84 percent of theoretical.

Fractional Crystallization

The dried mixture of 6'-acetate esters of the zearalanol diamers was dissolved in methanol in the proportion of 1g. of mixture per 15 ml. of methanol, at reflux temperature. The solution was filtered and the filtrate was aged with stirring at 25° to 30° C. for about 2 hours. The temperature was then lowered to 15° to 20° C. and the solution held there until precipitation was complete (an additional 18 to 24 hours). The precipitated 6'-acetate ester of the high melting diamer of zearalanol was isolated, rinsed with chilled methanol, and dried. A portion of the precipitate was recrystallized from methanol and analyzed, with the following results:

| Melting Point: | 133–134°C. (After pre-melting and re-solidifying). |
| Elemental Weight Percent: | Calculated (for $C_{20}H_{28}O_6 \cdot CH_3OH$): 63.61%C and 8.14%H. |
| Found: | 63.56%C and 7.83%H. |

The methanolic filtrate was concentrated under reduced pressure and the resultant 6'-acetate ester of the low melting diamer of zearalanol was recovered by filtration. The precipitate was recrystallized from ethyl acetate, in the proportion of 1 gram of precipitate per 5 ml. of ethyl acetate, to yield a product having a melting point of 163°–164°C.

De-esterification

A mixture of 19.8g. (0.05 mole) of the 6'-acetate of the high melting diamer of zearalanol, 100 ml. of methanol, and 5.0 ml. of 37 percent hydrochloric acid was heated at reflux for 3 to 4 hours. The reaction mixture was filtered and the filtrate, while warm, was stirred and diluted with 25 ml. of warm water (55°–60° C.). After initial crystallization was nearly complete, an additional 25 ml. of water was added slowly. Stirring was continued and the mixture was allowed to stand at room temperature for about 2 hours, followed by an additional holding period of 4 hours at 15°–20° C. (tap water). The precipitated high melting diamer of zearalanol was isolated by filtration and dried: weight, 14.7 gms.; yield, 91.3 percent; m.p., 182.3°C.

A mixture of 18.2 g. (0.05 mole) of the recrystallized 6'-acetate of the low melting diamer of zearalanol, 100 ml. of methanol, and 5.0 ml. of 37 percent hydrochloric acid was heated at reflux for 3 to 4 hours. The reaction mixture was filtered and the filtrate, while warm, was diluted with 100 ml. of warm water (55°–60° C.). After initial crystallization was nearly complete, an additional 100 ml. of water was slowly added. Stirring was continued and the mixture was allowed to stand at room temperature for about 2 hours, followed by an additional holding period of 4 hours at 15°–20° C. (tap water). The precipitated low melting diamer of zearalanol was isolated by filtration and dried: weight, 15.2 gms.; yield, 95 percent; m.p., 155°–156°C.

I claim:

1. A process of separating mixed diastereoisomers of zearalanol which comprises
   i. dissolving the mixed diastereoisomers in acetic acid having a $CH_3COOH$ concentration, based on the weight of the acid, of at least about 90 percent;
   ii. maintaining the resultant solution at a temperature sufficient to effect esterification of the aliphatic hydroxyl group of the zearalanol, thus yielding mixed 6'-acetate esters of the diastereoisomers of zearalanol;
   iii. separating the 6'-acetate esters of the diastereoisomers of zearalanol by fractional crystallization from a solution of the mixed esters in a monohydric alkanol of one to five carbon atoms; and
   iv. de-esterifying the acetate groups of the separated 6'-acetate esters of the diastereoisomers of zearalanol, thus yielding separated diastereoisomers of zearalanol.

2. The process of claim 1 wherein the acetic acid employed in step (i) is glacial acetic acid.

3. The process of claim 2 wherein the ratio of acetic acid to zearalanol in the solution prepared in step (i) is about 2 to 10 milliliters per gram of zearalanol.

4. The process of claim 1 wherein, in step (ii), the solution is maintained at about 15° to 120° C., for at least about 18 hours.

5. The process of claim 1 wherein, in step (iii), the mixed esters are in solution in methanol for their separation by fractional crystallization, and the fractional crystallization is effected by cooling the methanolic solution down to a temperature of about 30° C. or lower to selectively crystallize out of solution the 6'-acetate of the high melting diastereoisomer of zearalanol.

6. The process of claim 5 wherein the methanolic solution contains about 10 to 20 milliliters of methanol per gram of zearalanol, 6'-acetate prior to the crystallization of the 6'-acetate of the high melting zearalanol diastereoisomer therefrom.

7. The process of claim 6 wherein the methanolic solution is substantially continuously agitated during the crystallization therefrom of the 6'-acetate of the high melting diastereoisomer of zearalanol.

8. The process of claim 1 wherein the de-esterification of the acetate groups of the separated 6'-acetate esters of the diastereoisomers of zearalanol is effected by subjecting the esters to transesterification with a monohydric alkanol of one to five carbon atoms.

9. The process of claim 8 wherein the transesterification is acid catalyzed.

10. The process of claim 9 wherein the displacing alcohol is methanol.

11. The process of claim 10 wherein the acid catalyst employed is sulfuric acid or hydrochloric acid.

12. The process of claim 11 wherein the transesterification is effected at about 50° to 65°C.

13. The process of claim 12 wherein the ratio of methanol to zearalanol, 6'-acetate employed in the transesterification reaction is about 2.5 to 10 milliliters per gram of zearalanol, 6'-acetate.

14. The process of claim 13 wherein the molar ratio of acid catalyst to zearalanol, 6'-acetate employed in the transesterification reaction is about 0.001 to 0.1.

15. A process of separating mixed diastereoisomers of zearalanol which comprises
   i. dissolving the mixed diastereoisomers in glacial acetic acid at a ratio of about 3 to 7 milliliters of glacial acetic acid per gram of zearalanol;
   ii. maintaining the resultant solution at about 15° to 120° C. for about 18 to 36 hours so as to effect esterification of the aliphatic hydroxyl group of the zearalanol, thus yielding mixed 6'-acetate esters of the diastereoisomers of zearalanol;
   iii. forming a methanolic solution of the mixed 6'-acetate esters of the diastereoisomers of zearalanol, said solution containing about 12 to 15 milliliters of methanol per gram of zearalanol, 6'-acetate, and cooling the solution, while substantially continuously agitating same, down to a temperature of about 5° to 20° C., so as to selectively crystallize the 6'-acetate of the high melting diastereoisomer of zearalanol out of the solution, thereby separating the 6'-acetate esters of the diastereoisomers of zearalanol; and
   iv. transesterifying the acetate groups of the 6'-acetate esters of the diastereoisomers of zearalanol with methanol so as to yield separated diastereoisomers of zearalanol, said transesterification reaction being effected with acid catalysis at about 50° to 65° C., using about 2.5 to 10 milliliters of methanol per gram of zearalanol, 6'-acetate and about 0.01 to 0.1 moles of sulfuric or hydrochloric acid, as catalyst, per mole of zearalanol, 6'-acetate.

16. The process of claim 15 wherein step (ii) is conducted in the absence of acidic catalyst and at a temperature of about 75° to 120° C.

17. The process of claim 15 wherein step (ii) is conducted in the presence of about 0.1 to 5 parts of concentrated sulfuric acid per each 100 parts by weight of $CH_3COOH$ and at a temperature of about 15° to 40° C.

* * * * *